US009673679B2

(12) United States Patent
Azuma et al.

(10) Patent No.: US 9,673,679 B2
(45) Date of Patent: Jun. 6, 2017

(54) DRIVING DEVICE

(71) Applicant: Nabtesco Corporation, Tokyo (JP)

(72) Inventors: Takahito Azuma, Tsu (JP); Hiroki Mizuhashi, Tsu (JP)

(73) Assignee: NABTESCO CORPORATION, Tokyo (JP)

( * ) Notice: Subject to any disclaimer, the term of this patent is extended or adjusted under 35 U.S.C. 154(b) by 608 days.

(21) Appl. No.: 14/354,262

(22) PCT Filed: Oct. 25, 2012

(86) PCT No.: PCT/JP2012/077598
§ 371 (c)(1),
(2) Date: Apr. 25, 2014

(87) PCT Pub. No.: WO2013/062046
PCT Pub. Date: May 2, 2013

(65) Prior Publication Data
US 2014/0312728 A1    Oct. 23, 2014

(30) Foreign Application Priority Data

Oct. 27, 2011    (JP) ................................ 2011-235928

(51) Int. Cl.
*H02K 16/00*    (2006.01)
*H02K 7/00*    (2006.01)
(Continued)

(52) U.S. Cl.
CPC ............. *H02K 7/003* (2013.01); *H02K 7/116* (2013.01); *H02K 16/00* (2013.01); *H02K 21/24* (2013.01)

(58) Field of Classification Search
CPC ........ H02K 7/116; H02K 7/003; H02K 16/00; F16H 1/32
(Continued)

(56) References Cited

U.S. PATENT DOCUMENTS 4,081,726 A    3/1978    Brimer et al.
6,876,113 B1 *    4/2005    Harris .................... F02B 63/04
123/3
(Continued)

FOREIGN PATENT DOCUMENTS

CN    1361578 A    7/2002
CN    101868648 A    10/2010
(Continued)

OTHER PUBLICATIONS

Machine translation of Akuma et al. 2009159725, Akuma et al., Jul. 2009.*
(Continued)

*Primary Examiner* — Terrance Kenerly
(74) *Attorney, Agent, or Firm* — J-Tek Law PLLC; Jeffrey D. Tekanic; Scott T. Wakeman

(57) ABSTRACT

A driving device is provided with a gear unit and a plurality of motors. The gear unit includes a plurality of input shafts supported by a supporting member, and a driven member to which the plurality of input shafts is engaged. Each motor rotor is respectively attached to a corresponding one of the input shafts. Each motor stator is attached to a housing that is detachably attached to the supporting member. When the housing is attached to the supporting member, phase angles of the rotors of all of the motors are equal.

14 Claims, 7 Drawing Sheets

(51) Int. Cl.
*H02K 7/116* (2006.01)
*H02K 21/24* (2006.01)

(58) Field of Classification Search
USPC .......................................................... 310/112
See application file for complete search history.

(56) References Cited

U.S. PATENT DOCUMENTS

| | | | |
|---|---|---|---|
| 8,393,424 | B2 | 3/2013 | Makino et al. |
| 8,621,958 | B2 | 1/2014 | Biester |
| 2002/0113511 | A1 | 8/2002 | Daikoku et al. |
| 2008/0176701 | A1 | 7/2008 | Yamamoto et al. |
| 2009/0178506 | A1 | 7/2009 | Yamamoto et al. |
| 2010/0080498 | A1 | 4/2010 | Tamura et al. |
| 2010/0086248 | A1 | 4/2010 | Yamamoto et al. |
| 2010/0292040 | A1 | 11/2010 | Yamamoto et al. |
| 2011/0133541 | A1 | 6/2011 | Makino et al. |
| 2011/0319219 | A1* | 12/2011 | Suzuki ................. B60K 7/0007 475/168 |
| 2012/0006608 | A1* | 1/2012 | Suzuki ................. B60K 7/0007 180/65.51 |
| 2012/0241233 | A1* | 9/2012 | Suzuki ................. B60K 7/0007 180/65.6 |
| 2014/0260791 | A1 | 9/2014 | Azuma et al. |
| 2016/0183836 | A1* | 6/2016 | Muuranto ........... A61B 5/04288 600/301 |

FOREIGN PATENT DOCUMENTS

| | | |
|---|---|---|
| CN | 101878583 A | 11/2010 |
| EP | 2234249 A | 9/2010 |
| JP | 2002262528 A | 9/2002 |
| JP | 2005321104 A | 11/2005 |
| JP | 2009052630 A | 3/2009 |
| JP | 2009159658 A | 7/2009 |
| JP | 2009159725 * | 7/2009 ............ H02K 7/003 |
| JP | 2009159725 A | 7/2009 |
| JP | 2010014177 A | 1/2010 |
| WO | 2009081793 A | 7/2009 |

OTHER PUBLICATIONS

Comparison of performance of the axial-field and radial field permanent magnet direct current motors.*
Office Action from the Taiwanese Patent Office dated Feb. 19, 2016 in counterpart Taiwanese application No. 101139768, and translation of substantive portions thereof.
Office Action from the United States Patent Office mailed Nov. 30, 2016 in related U.S. Appl. No. 14/354,271, including examined claims 1-20.
Office Action from the Japanese Patent Office dated Jun. 2, 2015 in related Japanese application No. 2011-235928, and translation thereof.
Office Action from the Japanese Patent Office dated Jun. 2, 2015 in related Japanese application No. 2011-235929, and translation thereof.
Office Action from the Chinese Patent Office dated Dec. 22, 2015 in related Chinese application No. 201280052854.3, and translation of substantive portions thereof.
Office Action from the Chinese Patent Office dated Nov. 27, 2015 in related Chinese application No. 201280052833.1, and translation of substantive portions thereof.
Office Action from the Taiwanese Patent Office dated May 23, 2016 in related Taiwanese application No. 101139769, and translation of substantive portions thereof.
English translation of International Preliminary Report on Patentability for parent application No. PCT/JP2012/077598.
English translation of International Search Report for parent application No. PCT/JP2012/077598.
Unpublished U.S. Appl. No. 14/354,271.

* cited by examiner

US 9,673,679 B2

DRIVING DEVICE

TECHNICAL FIELD

The present application claims priority to Japanese Patent Application No. 2011-235928, filed on Oct. 27, 2011, the contents of which are hereby incorporated by reference into the present application. This application relates to a driving device provided with a gear unit and a plurality of motors.

BACKGROUND ART

A driving device is known in which a gear unit comprises a plurality of input shafts, and motors individually coupled to each of the input shafts. An example of this driving device is disclosed in Japanese Patent Application Publication No. 2009-159725. In the description below, Japanese Patent Application Publication No. 2009-159725 is called Patent Document 1. In the driving device of Patent Document 1, the plurality of input shafts is supported by a supporting member. The plurality of input shafts is engaged with driven members, and drives the driven members. The rotors of the motors are respectively attached to the input shafts. More specifically, in the driving device of Patent Document 1, a plurality of crankshafts (input shafts) is supported by a carrier (supporting member), and the plurality of crankshafts is engaged with external gears (driven members). In the driving device of Patent Document 1, a rotor is attached to each of the crankshafts, and stators of all of the motors are attached to the carrier.

In the driving device of Patent Document 1, in all of the motors, the mechanical phase angle of the rotor is aligned relative to the stator. By aligning the mechanical phase angle, all of the motors are controlled by one motor driver. However, it is difficult to affix the stator to the carrier (supporting member) while aligning the phase angle of the rotor. Consequently, in the cited Document 1, in order to align the phase angles of the rotors of all of the motors, the stators are affixed to the carrier while the rotors are in a state of being temporarily fixed to the crankshafts. Then, in-phase current is applied to all of the motors, and the rotors are affixed to the crankshafts in a state where the phase angles of the rotors are aligned relative to the stators.

SUMMARY OF THE INVENTION

As described above, in the technique of Patent Document 1, by aligning the phase angles of the rotors in all of the motors, the plurality of motors is controlled by one motor driver. The present specification provides a technique for more simply aligning the phase angles of rotors in all of the motors in a driving device comprising a plurality of motors.

A driving device disclosed in the present specification comprises a gear unit and a plurality of motors. The gear unit comprises a driven member and a plurality of input shafts. The plurality of input shafts is supported by a supporting member. The plurality of input shafts is engaged with the driven member. Each motor rotor is attached to a corresponding one of the input shafts. Each motor stator is attached to a housing that is detachably attached to the supporting member. In this driving device, when the housing is attached to the supporting member, phase angles of the rotors relative to the stators are equal in all of the motors.

In the aforementioned driving device, the rotors are attached to the input shafts, and the stators are attached to the housing. The supporting member, which supports the input shafts, and the housing are detachably attached. In other words, the part to which the rotors are attached and the part to which the stators are attached are detachable. Therefore, the angle of the rotors relative to the input shafts, and the angle of the stators relative to the housing can be adjusted separately. Consequently, the phase angles of the rotors relative to the stators are aligned easily in all of the motors merely by affixing the housing to the supporting member.

In the aforementioned driving device, unlike the prior art, it is not necessary to adjust the phase angles of the rotors after temporarily fixing the rotors to the input shafts and affixing the stators to the supporting member. Moreover, in this driving device, the housing can be removed from the supporting member without changing the angle of the rotors relative to the input shafts, and the angle of the stators relative to the housing.

The techniques disclosed in the present specification allow, in a driving device comprising a plurality of motors, a driving device to be realized easily in which the phase angles of the rotors are aligned in all of the motors.

MODE(S) FOR CARRYING OUT THE INVENTION

Figure 1:
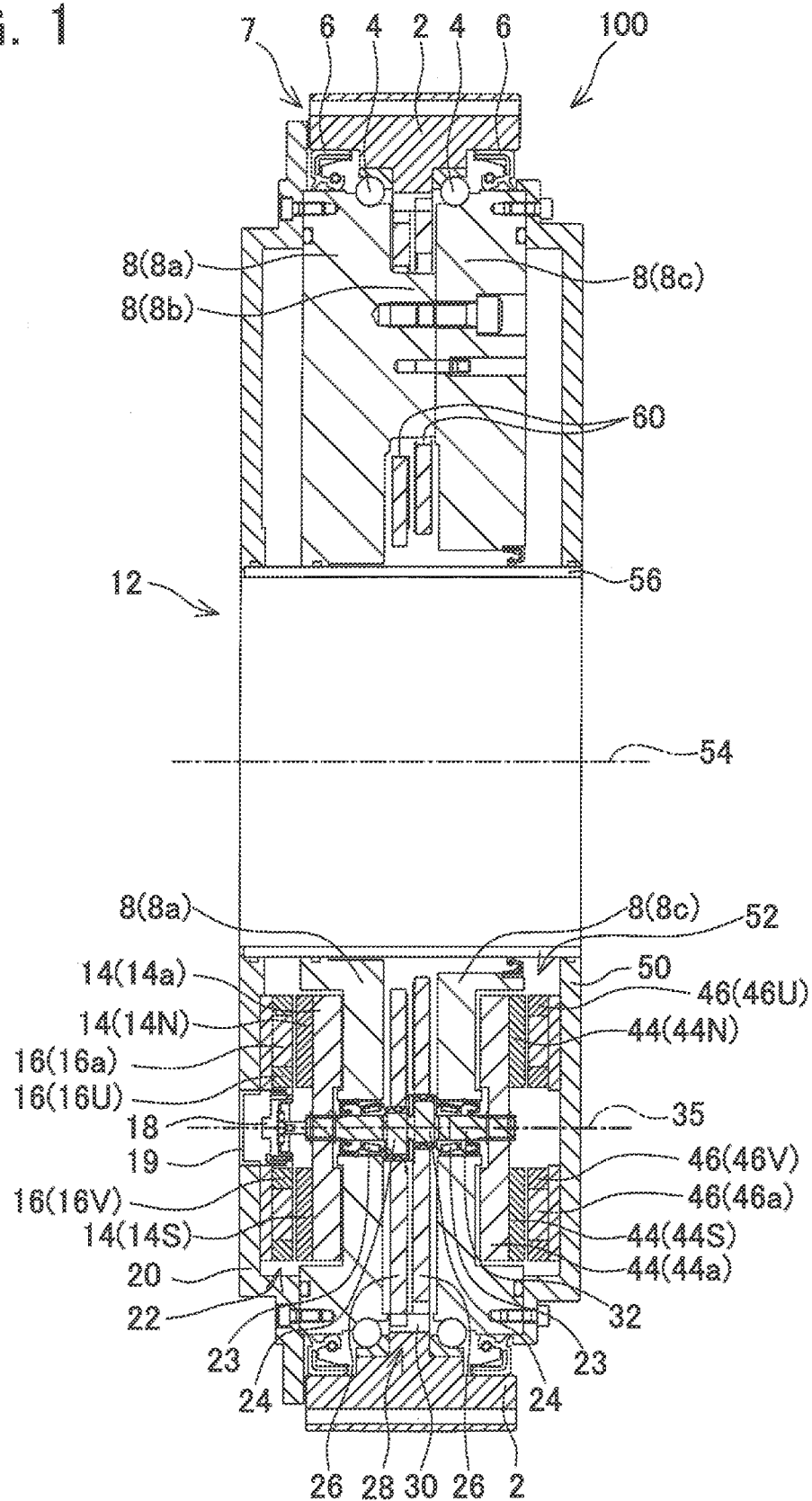
FIG. 1 shows a cross-sectional view of a driving device of a first embodiment.

Below, some technical features disclosed in the present specification will be noted. Moreover, the items described below have technical utility individually.

Examples of the plurality of motors are radial gap motors, axial gap motors, etc. The plurality of motors may be axial gap motors. A thin driving device can thereby be realized.

In the driving device, two axial gap motors may be attached to each input shaft. In this case, the two axial gap motors may be disposed such that their rotors face each other. Alternatively, the two axial gap motors may be disposed such that their stators face each other. Moreover, in the description below, in case two axial gap motors are attached to one input shaft, the two axial gap motors may be called "first axial gap motor" and "second axial gap motor" in order to differentiate the two. Further, the rotor and stator of the first axial gap motor may respectively be called "first rotor" and "first stator". Similarly, the rotor and stator of the second axial gap motor may respectively be called "second rotor" and "second stator". According to this driving device, the balance is improved of an attracting force occurring between the first rotor and the first stator, and of an attracting force occurring between the second rotor and the second stator. Consequently, the input shaft(s) rotate(s) smoothly.

In case two axial gap motors are attached to each input shaft, it may be the following configuration. That is, each input shaft may extend from the driven member to both sides of an axial direction of the driven member. The first axial gap motor may be disposed at one end of each input shaft, and the second axial gap motor may be disposed at the other end of each input shaft. That is, the first axial gap motor may be disposed at the opposite side from the second axial gap motor relative to the driven member. With such a form, the two axial gap motors can easily be attached to the gear unit while the phase angles of the rotors are matching. Further, at the two ends of the input shaft(s), the attracting forces of the motor act in opposite directions of each other with respect to the input shaft. Therefore, the input shaft(s) can rotate more smoothly.

In case the axial gap motors (first axial gap motor and second axial gap motor) are disposed at the two ends of the input shaft(s), it may be the following configuration. That is, the first stator(s) may be attached to a first housing that is detachably attached to the supporting member, and the second stator(s) may be attached to a second housing that is detachably attached to the supporting member. In this driving device, when the first housing and the second housing are attached to the supporting member, the phase angles of the rotors are equal in all of the motors. In this type of driving device, the phase angles of the rotors can be made to match in all of the motors merely by attaching the first housing and the second housing to the supporting member.

An eccentric oscillating gear transmission can be given as a typical example of a gear unit. In an eccentric oscillating gear transmission, an external gear rotates eccentrically while meshing with an internal gear. Alternatively, an internal gear rotates eccentrically while meshing with an external gear. In the driving device disclosed in the present specification, the gear unit may be the type in which an external gear rotates eccentrically. This type of gear unit can be represented as follows. The gear unit comprises a case, a carrier, a plurality of crankshafts, and an external gear. An internal gear is formed on the inner circumference of the case. The carrier is supported by the case coaxially with the internal gear. Each of the crankshafts extends alongside an axis of the internal gear, and is supported by the carrier. Each of the crankshafts has an eccentric member. The external gear is engaged with the eccentric members, and rotates eccentrically while meshing with the internal gear. In this type of gear unit, the crankshafts and the rotors may be coupled by splines having pluralities of grooves. Moreover, the eccentric oscillating gear transmission may be called a cycloidal reduction gear.

Embodiments

In the following embodiments, a type of gear transmission is described in which a plurality of crankshafts is engaged with an external gear, and the external gear rotates eccentrically while meshing with an internal gear. The techniques disclosed in the present specification can also be applied to a type of gear transmission in which a plurality of crankshafts is engaged with an internal gear, and the internal gear rotates eccentrically while meshing with an external gear. Moreover, in the techniques disclosed in the present specification, the gear unit may be a type in which a plurality of input shafts is engaged with a driven member, and motors are individually coupled with each of the input shafts. If the gear unit is of such a type, it should be noted that the techniques disclosed in the present specification can also be applied to a gear unit other than an eccentric oscillating gear transmission.

First Embodiment

The driving device 100 shown in FIG. 1 comprises a gear unit 7 and two axial gap motors 22, 52. The gear unit 7 is a gear transmission in which external gears 26 rotate eccentrically while meshing with an internal gear 28. The gear unit 7 comprises two external gears 26. In the gear unit 7, a carrier 8 rotates in accordance with the difference in the number of teeth of the external gears 26 and the number of teeth of the internal gear 28. The internal gear 28 is comprised of a case 2 and a plurality of internal-teeth pins 30 disposed on an inner circumference of the case 2.

The gear unit 7 comprises the case 2, the carrier 8, crankshafts 32, and the external gears 26. The carrier 8 corresponds to a supporting member, the crankshafts 32 correspond to input shafts, and the external gears 26 correspond to driven members. The carrier 8 comprises a first plate 8a and a second plate 8c. A gap exists between the first plate 8a and the second plate 8c. A columnar part 8b extends from the first plate 8a toward the second plate 8c. The columnar part 8b and the second plate 8c are affixed. The columnar part 8b passes through a through hole 60 of the external gears 26. The external gears 26 are disposed between the first plate 8a and the second plate 8c. The carrier 8 is supported coaxially with the case 2 by a pair of angular contact ball bearings 4. Axis 54 corresponds to an axis of the carrier 8. The axis 54 also corresponds to an axis of the internal gear 28 (the case 2).

An oil seal 6 is disposed between the case 2 and the carrier 8. A first motor housing 50 and a second motor housing 20 are affixed to the two ends in the axis 54 direction of the carrier 8. A through hole is formed through the carrier 8 and through centers of the first motor housing 50 and the second motor housing 20. A cylindrical shaft 56 fits into the through hole. Consequently, the driving device 100 comprises through hole 12 along the axis 54.

Each crankshaft 32 is supported by the carrier 8 via a pair of bearings 23. The bearings 23 are tapered roller bearings. The crankshaft(s) 32 extend(s) parallel to the axis 54 at (a) position(s) offset from the axis 54. The crankshaft(s) 32 comprise(s) two eccentric members 24. The two eccentric members 24 are engaged with the respective external gears 26. The two eccentric members 24 are eccentric in opposite directions of one another relative to an axis 35 of the crankshaft 32. The crankshaft(s) 32 extend(s) to both sides, in the direction of the axis 35, from the eccentric members 24. In other words, the crankshaft(s) 32 extend(s) from the external gears 26 to both sides in the axial direction of the external gears 26.

A first axial gap motor 52 and a second axial gap motor 22 are attached to respective ends of the crankshaft(s) 32. Further, an encoder 18 is attached to one end of a crankshaft 32. A through hole is formed in the second motor housing 20 outwardly from the encoder 18 in the direction of the axis 35. A cap 19 is attached to this through hole.

The first axial gap motor(s) 52 and the second axial gap motor(s) 22 are disposed facing each other. The phase angle of the first axial gap motor(s) 52 and the phase angle of the second axial gap motor(s) 22 are aligned. Therefore, the crankshaft(s) 32 rotate(s) smoothly. As will be described in detail later, the gear unit 7 comprises three crankshafts 32. The three crankshafts 32 are disposed at equal intervals around the axis 54. In other words, the three crankshafts 32 are disposed at equal intervals in the circumferential direction of the carrier 8.

The first axial gap motors 52 and the second axial gap motors 22 are respectively attached to the three crankshafts 32. The phase angles of the axial gap motors 52, 22 attached to the three crankshafts 32 are all aligned. Since the phase angles of all the axial gap motors are aligned, all the axial gap motors can be controlled by one motor driver (not shown). The encoder 18 is attached to one of the three crankshafts 32. A brake (not shown) is attached to the other two crankshafts 32.

Figure 2:
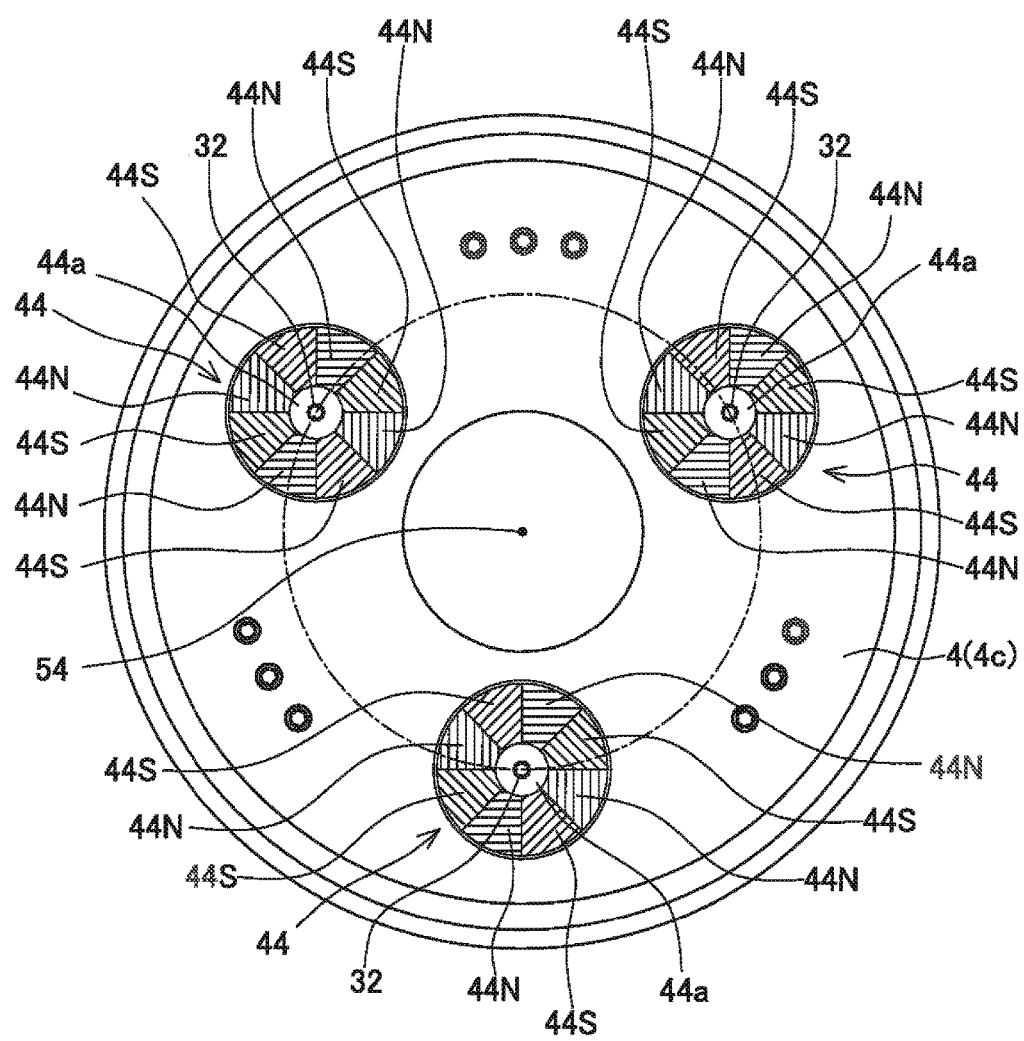
FIG. 2 shows a plan view of a gear unit, in the driving device of the first embodiment, in a state where a housing has been removed from a supporting member.

The first axial gap motors 52 are comprised of first rotors 44 and first stators 46. The first rotors 44 are attached to the crankshafts 32. As shown in FIG. 2, the first rotors 44 are respectively attached to the three crankshafts 32. The three crankshafts 32 are disposed at equal intervals around the axis 54. Similarly, the three first rotors 44 are disposed at equal intervals around the axis 54. Permanent magnets 44N and permanent magnets 44S are arranged alternately on each of the first rotors 44. The permanent magnets 44N are affixed to a surface of a plate 44a, and the N poles thereof face outward (see also FIG. 1). The permanent magnets 44S are fixed to the surface of the plate 44a, and the S poles thereof face outward. The angle of the first rotor 44 relative to the crankshaft 32 is equal in all of the first rotors 44. In other words, the positions of the N poles and S poles relative to the crankshaft 32 are equal in all of the first rotors 44. The crankshafts 32 and the first rotors 44 are coupled by splines having pluralities of grooves.

Figure 3:
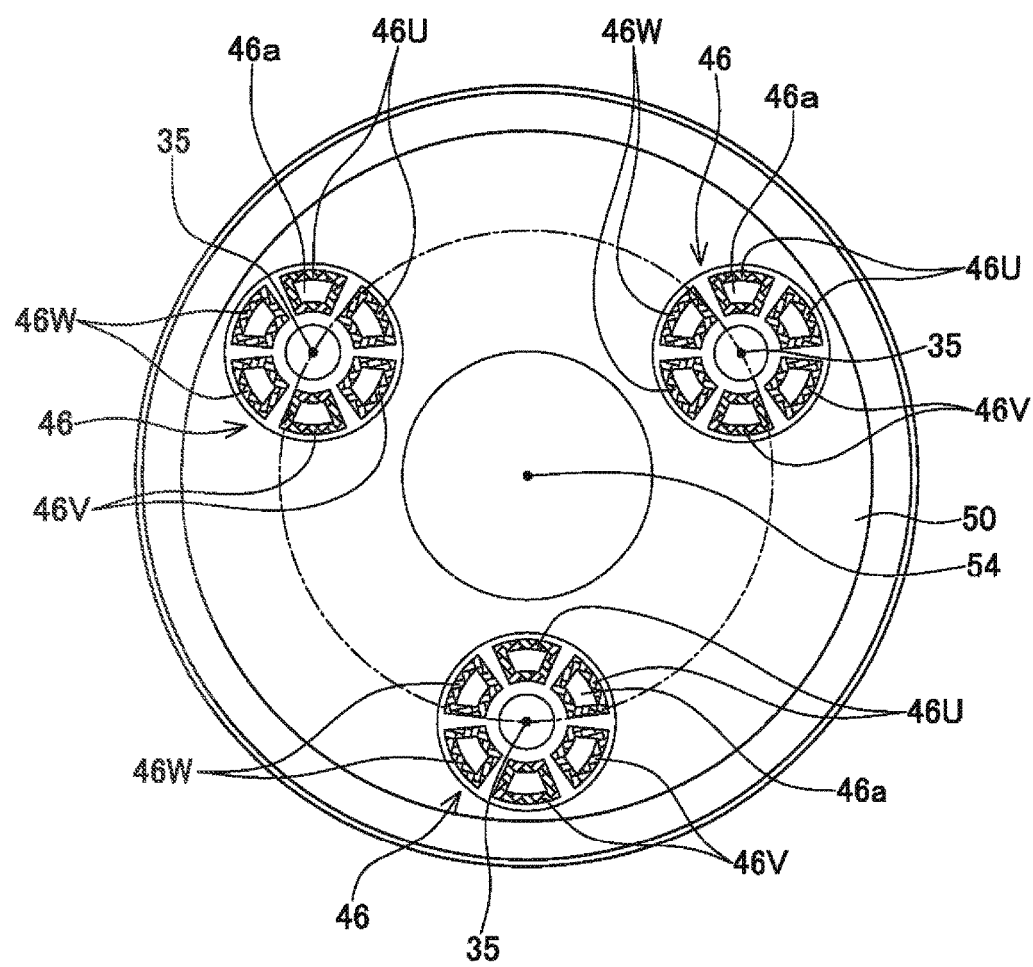
FIG. 3 shows a plan view of the housing, in the driving device of the first embodiment, which was removed from the supporting member.

As shown in FIG. 3, the three first stators 46 are attached to the first motor housing 50. The three first stators 46 are disposed at equal intervals around the axis 54. The centers of the first stators 46 respectively match the axes 35 of the crankshafts 32 (see also FIG. 1). Each of the first stators 46 comprises a winding 46U through which U phase current flows, a winding 46V through which V phase current flows, and a winding 46W through which W phase current flows. The windings 46U, 46V and 46W are wound around a stator core(s) 46a. The stator cores 46a are formed of a magnetic powder core. The angle of the first stator 46 relative to the first motor housing 50 is equal in all of the first stators 46. In other words, the positions at which the windings 46U, 46V and 46W are attached (rotation angle) relative to the axis 35 of the crankshaft are equal in all of the first stators 46. The first stators 46 are attached to the first motor housing 50 by affixing the stator cores 46a to the first motor housing 50 using adhesive. Moreover, in FIG. 1 the windings 46U, 46V are shown, but the winding 46W is not shown.

As shown in FIG. 1, the second axial gap motors 22 are comprised of a second rotor 14 and a second stator 16. The second rotors 14 comprise permanent magnets 14N in which the N poles face outward, and permanent magnets 14S in which the S poles face outward. The permanent magnets 14N, 14S are affixed to a surface of a plate 14a. Each of the second stators 16 comprises a winding 16U through which U phase current flows, a winding 16V through which V phase current flows, and a winding 16W through which W phase current flows. The windings 16U, 16V and 16W are wound around (a) stator core(s) 16a. In FIG. 1, the windings 16U, 16V are shown, and the winding 16W is not shown.

The configuration of the second axial gap motors 22 is essentially the same as the first axial gap motors 52. Therefore, a detailed description of the second axial gap motors 22 is omitted. Moreover, when viewing the axial gap motors 22, 52 from the direction of the axes 35, the permanent magnets 14N and the permanent magnets 44N are disposed so as to overlap. Similarly, the permanent magnets 14S and the permanent magnets 44S are disposed so as to overlap. Further, the winding 16U and the winding 46U are disposed so as to overlap, the winding 16V and the winding 46V are disposed so as to overlap, and the winding 16W and the winding 46W are disposed so as to overlap.

When the crankshafts 32 rotate, the eccentric members 24 rotate eccentrically around the axes 35. Following the eccentric rotation of the eccentric members 24, the external gears 26 rotate eccentrically around the axis 54 while meshing with the internal gear 28. The number of teeth of the external gears 26 and the number of teeth of the internal gear 28 (the number of internal-teeth pins 30) are different. Therefore, when the external gears 26 rotate eccentrically, the carrier 8 rotates relative to the internal gear 28 (the case 2) in accordance with the difference in the number of teeth of the external gears 26 and the internal gear 28.

Features of the driving device 100 will be described. In the description below, features shared by the first axial gap motors 52 and the second axial gap motors 22 may be described only for the first axial gap motor 52, and a description of the second axial gap motor 22 may be omitted. As described above, each of the first rotors 44 is affixed to the respective crankshaft 32, and each of the first stators 46 is affixed to the first motor housing 50. The first motor housing 50 can be removed from the carrier 8 which is supporting the crankshafts 32. Therefore, the operation of affixing the first rotors 44 to the crankshafts 32, and the operation of affixing the first stators 46 to the first motor housing 50 can be performed separately. Since the crankshafts 32 are supported by the carrier 8, the first rotors 44 can be said to be positioned relative to the carrier 8.

To concisely state the features of the driving device 100, the part (the carrier 8) for attaching the first rotors 44, and the part (the first motor housing 50) for attaching the first stators 46 are separate parts which can be detachably attached. The first rotors 44 are positioned by being attached to the carrier 8. The first stators 46 are positioned by being attached to the first motor housing 50. The operation of positioning the first rotors 44 relative to the carrier 8, and the operation of positioning the first stators 46 relative to the first motor housing 50 can be performed easily. When the first motor housing 50 is attached to the carrier 8, the phase angles of the first rotors 44 relative to the first stators 46 are aligned in all of the first axial gap motors 52.

In the driving device of Patent Document 1, both the rotors and the stators are positioned relative to the carrier. It is difficult to affix stators to a carrier while also aligning the phase angles of rotors relative to the stators. Consequently, in Patent Document 1, the stators are affixed to the carrier while the rotors are in a state of being temporarily fixed to the crankshafts. Next, the rotors are affixed to the crankshafts in the state of aligning the phase angles of the rotors by flowing current therethrough. The techniques disclosed in the present specification can produce a driving device according to a method simpler than the conventional method.

Other features of the driving device 100 will be described. As described above, the first axial gap motor(s) 52 and the second axial gap motor(s) 22 are disposed facing each other. In the case of axial gap motors, an attracting force acts between the rotor and the stator. When only one axial gap motor is attached to a crankshaft 32, a force in the direction of the axis 35 acts on the crankshaft 32. By disposing the two axial gap motors 52, 22 facing each other on the crankshaft 32, the attracting forces of the two axial gap motors 52, 22 cancel each other. Specifically, the attracting forces of the two axial gap motors 52, 22 act on the crankshaft 32 in opposite directions of one another at the two ends of the crankshaft 32. The balance of the force(s) applied to the crankshaft 32 improves, and the crankshaft 32 rotates smoothly.

The first axial gap motor 52 and the second axial gap motor 22 are disposed at the two ends of the crankshaft 32. In other words, the first axial gap motor 52 is disposed on the opposite side from the second axial gap motor 22 relative to the external gears 26. More specifically, the axial gap motors 52, 22 are fixed to the crankshafts 32 on the outside, in the direction of the axis 35, of the pair of bearings (tapered roller bearings) 23. The first rotors 44 (the second rotors 14) can be affixed to the crankshafts 32 while the crankshafts 32 are being supported by the carrier 8.

Further, by attaching the axial gap motors 52, 22 at the two ends of a crankshaft 32, the first stator 46 and the second stator 16 can be disposed at the two ends of the axis 35. By disposing the axial gap motors 52, 22 at the two ends of the crankshaft(s) 32, the phase angles of the first rotors 44 (the second rotors 14) relative to the first stators 46 (the second stators 16) can be aligned easily by using the first motor housing 50 and the second motor housing 20.

The position(s) of the first axial gap motor(s) 52 and the position(s) of the second axial gap motor(s) 22 can also be expressed as follows. The first axial gap motor(s) 52 is (are) disposed at one end of the crankshaft(s) 32, and the second axial gap motor(s) 22 is (are) disposed at the other end of the crankshaft(s) 32. The first rotor(s) 44 and the second rotor(s) 14 are disposed between the first stator(s) 46 and the second stator(s) 16. The external gears 26 are disposed between the first rotor(s) 44 and the second rotor(s) 14. The first rotor(s) 44 is (are) disposed on the opposite side from the second stator(s) 16 relative to the second rotor(s) 14. The first stator(s) 46 is (are) disposed on the opposite side from the second rotor(s) 14 relative to the first rotor(s) 44.

Second Embodiment

Figure 4:
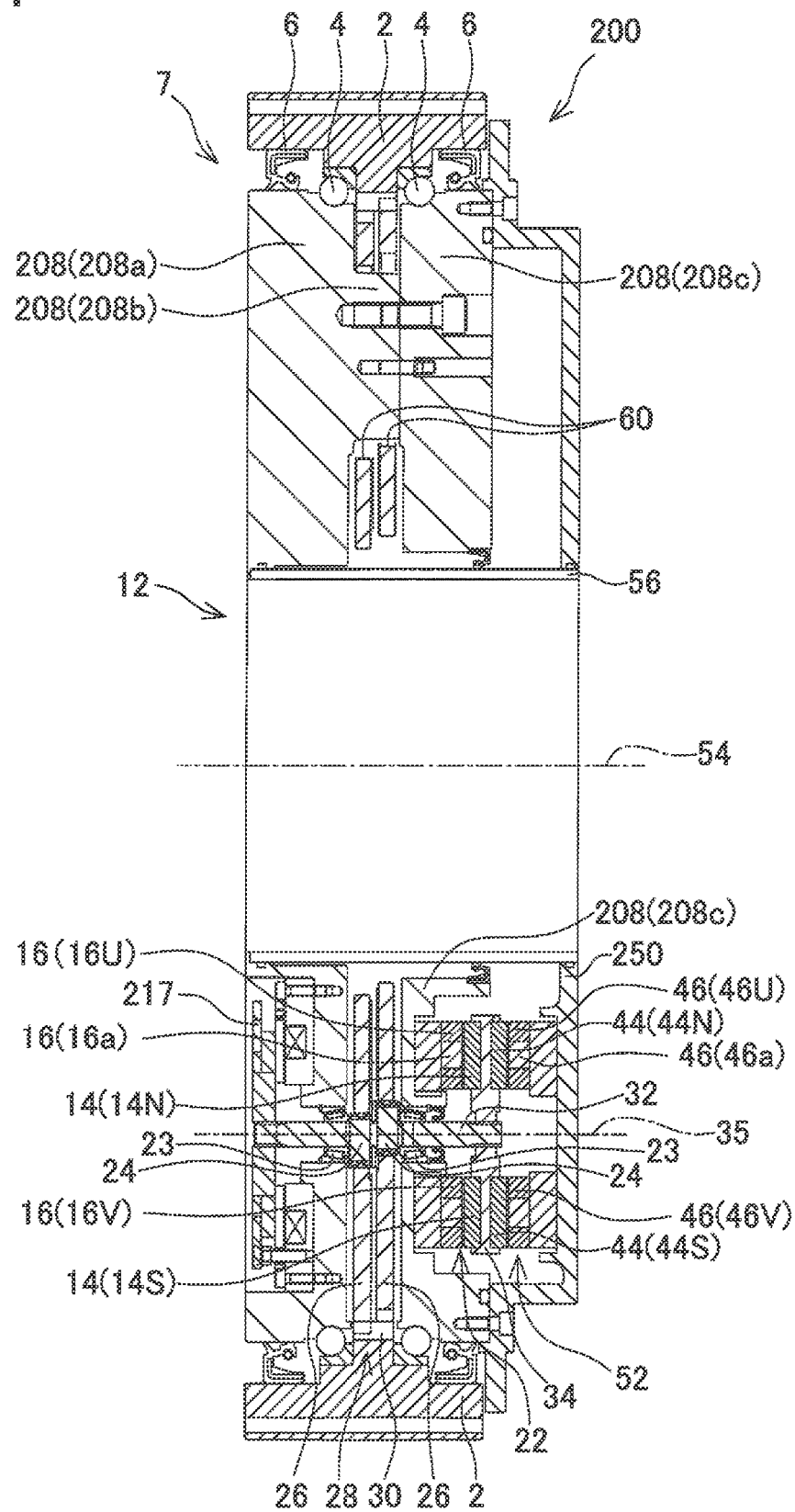
FIG. 4 shows a cross-sectional view of a driving device of a second embodiment.

Driving device (gear transmission) 200 will be described with reference to FIG. 4. The driving device 200 is a variant of the driving device 100. For the driving device 200, parts which are identical to those of the driving device 100 have reference numbers that are the same or have the same last two digits appended thereto, and an explanation thereof is omitted.

In the driving device 200, the first axial gap motor(s) 52 and the second axial gap motor(s) 22 are fixed to the crankshaft(s) 32 on the same side relative to the external gears 26. More specifically, the first axial gap motor(s) 52 is (are) disposed at one end of the crankshaft(s) 32. Further, the second axial gap motor(s) 22 is (are) disposed between the external gears 26 and the first axial gap motor(s) 52. A brake 217 is attached at the other end of the crankshaft 32. The driving device 200 also comprises three crankshafts 32. The brake 217 is attached to two of the three crankshafts 32. An encoder (not shown) is attached to the remaining one of the crankshafts 32.

In the driving device 200, as described above, two axial gap motors are disposed at the one end of the crankshaft(s) 32 in the direction of the axis 35. Consequently, a space for attaching a large-diameter brake 217 can be maintained at the other end of the crankshaft 32. Moreover, in the driving device 200 as well, the first axial gap motor(s) 52 and the second axial gap motor(s) 22 face one another. The attracting forces of the two axial gap motors 22, 52 act on the crankshaft(s) 32 in opposite directions of one another. The attracting force of the first axial gap motor 52 and the attracting force of the second axial gap motor 22 cancel each other. Thus, the crankshaft(s) 32 can rotate smoothly.

In the driving device 200, the first rotor(s) 44 and the second rotor(s) 14 are integrated. More specifically, the permanent magnets 44N, 44S are affixed to one surface of a plate 34, and the permanent magnets 14N, 14S are affixed to the other surface (the opposite surface) of the plate 34. The first rotor(s) 44 is (are) formed by the permanent magnets 44N, 44S and the plate 34, and the second rotor(s) 14 is (are) formed by the permanent magnets 14N, 14S and the plate 34. That is, the first rotor(s) 44 and the second rotor(s) 14 use the common plate 34.

In the driving device 200, the first stator(s) 46 is (are) affixed to a first motor flange 250, and the second stator(s) 16 is (are) affixed to a carrier 208. When the first motor flange 250 has been affixed to the carrier 208, the second stator(s) 16 is (are) affixed to the carrier 208 such that the winding(s) 46U of the first stator(s) 46 and the winding(s) 16U of the second stator(s) 16, the winding(s) 46V of the first stator(s) 46 and the winding(s) 16V of the second stator(s) 16, and the winding(s) 46W (not shown) of the first stator(s) 46 and the winding(s) 16W (not shown) of the second stator(s) 16 each face one another.

Third Embodiment

Figure 5:
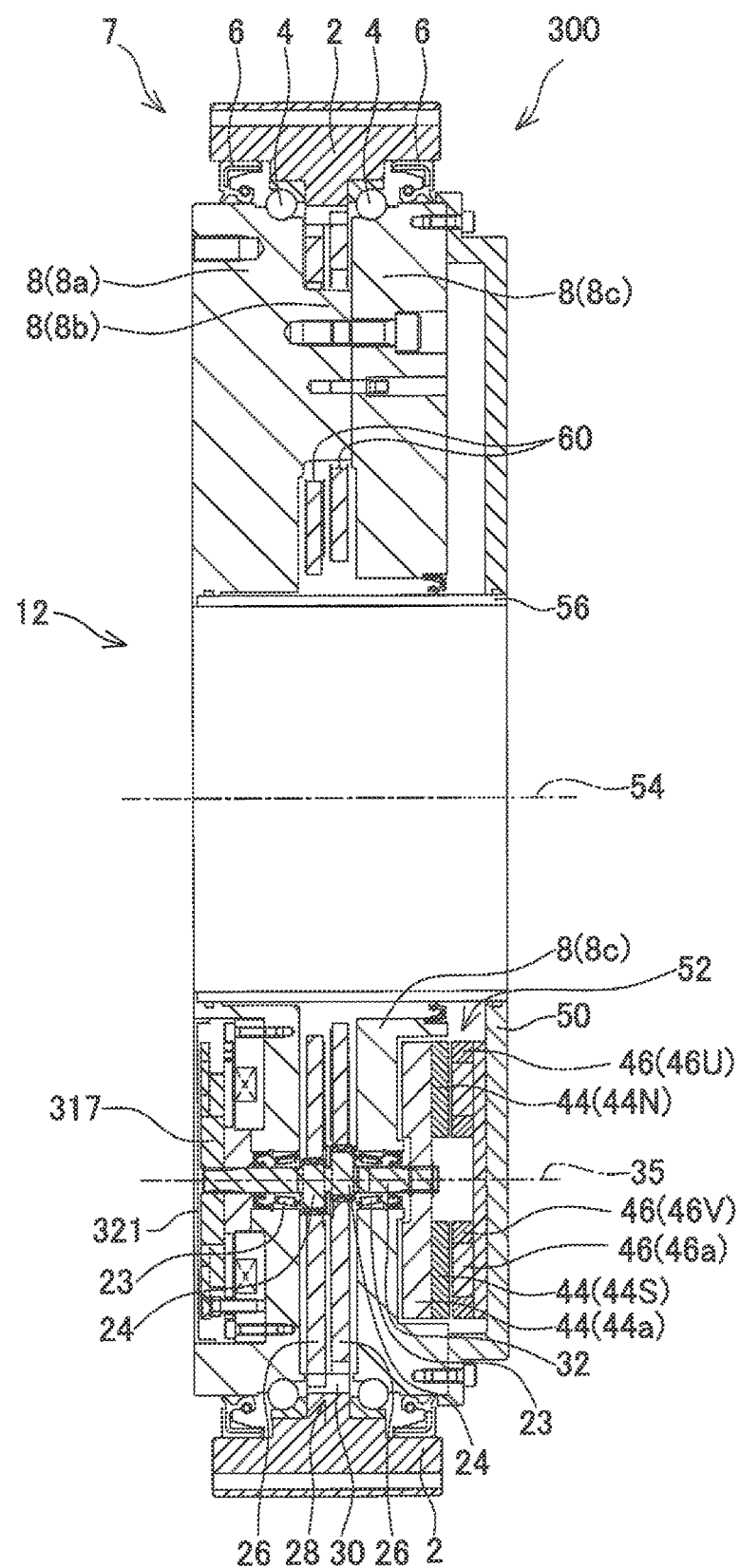
FIG. 5 shows a cross-sectional view (1) of a driving device of a third embodiment.
Figure 6:
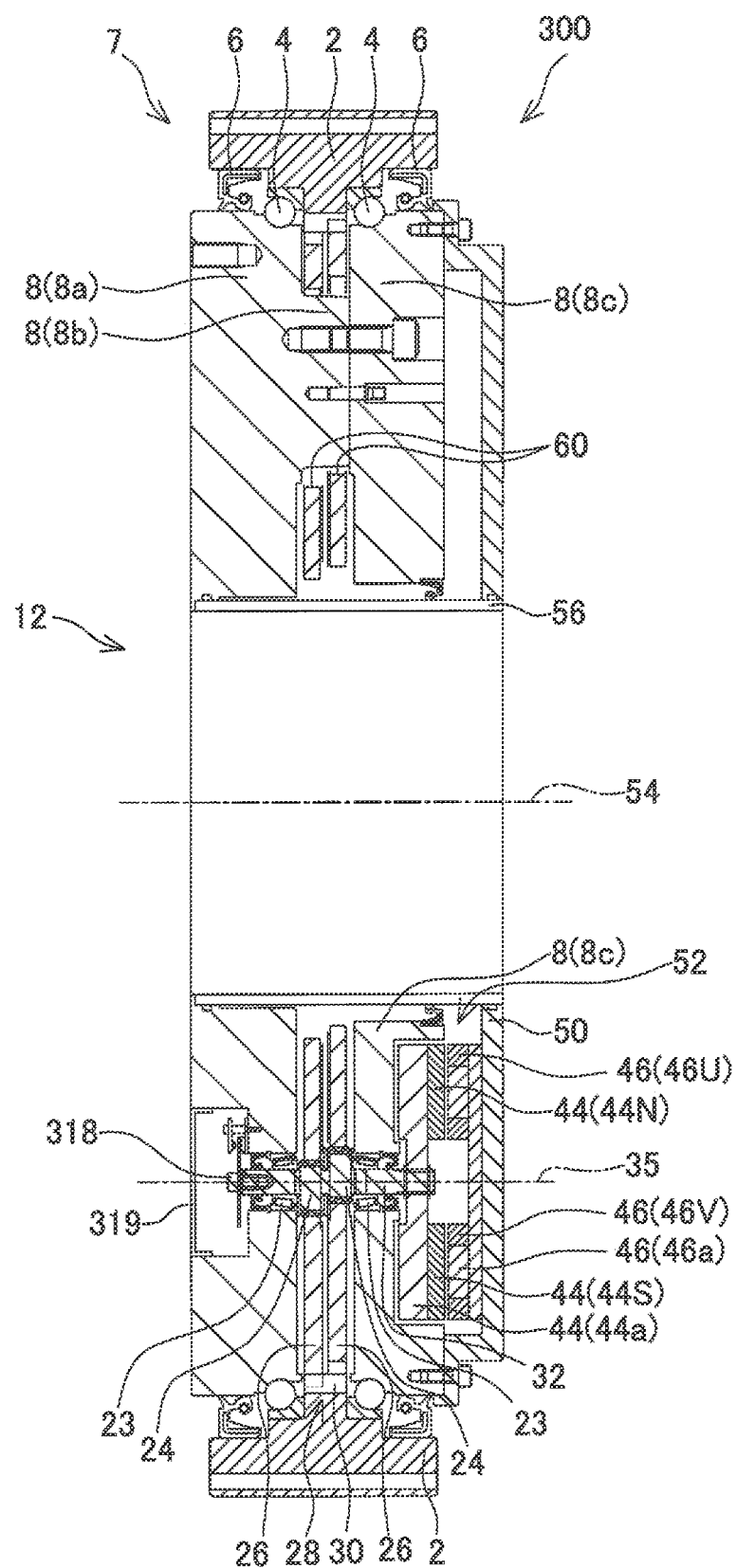
FIG. 6 shows a cross-sectional view (2) of the driving device of the third embodiment.
Figure 7:
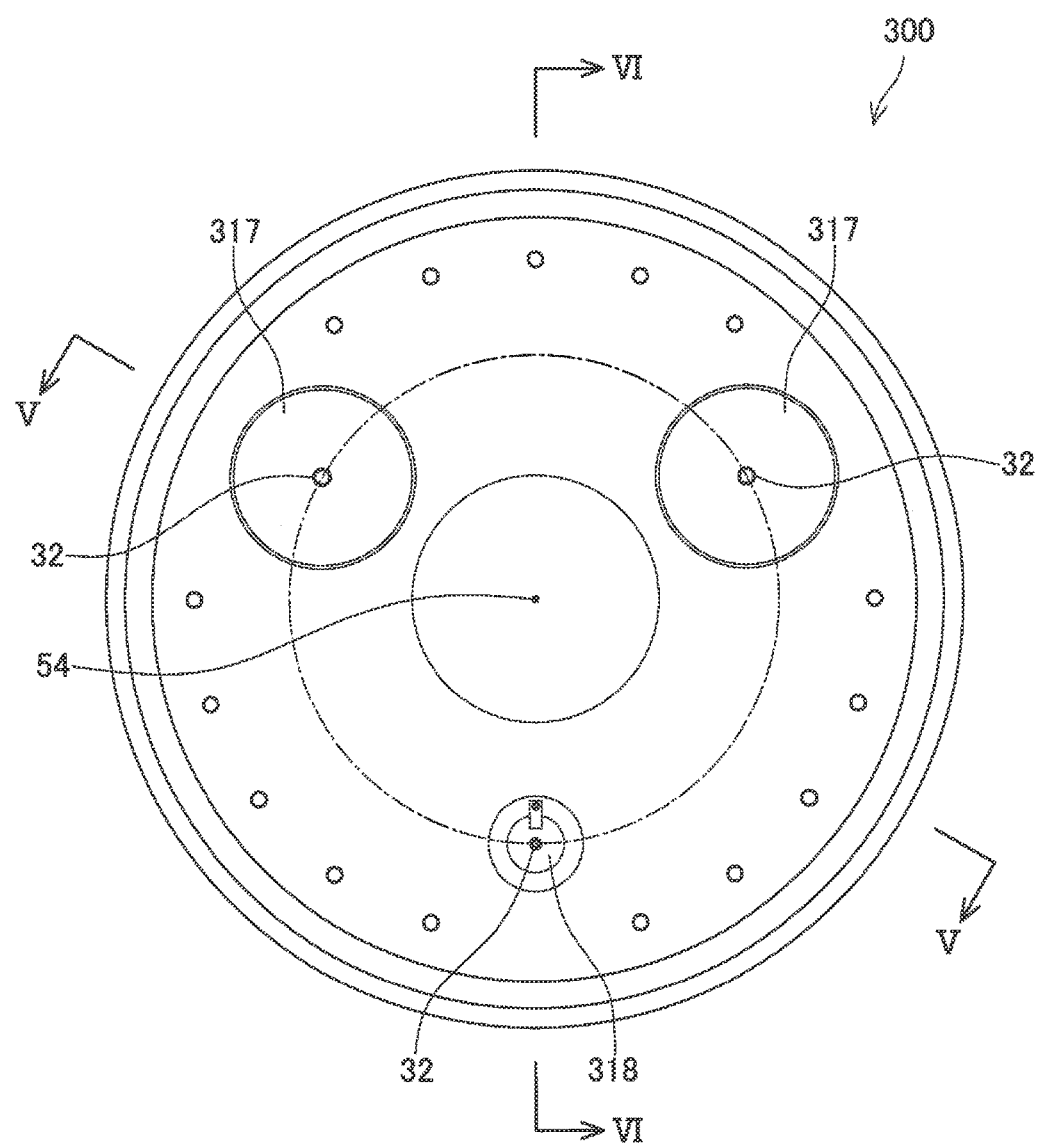
FIG. 7 shows a plan view of the driving device of the third embodiment.

Driving device (gear transmission) 300 will be described with reference to FIG. 5 to FIG. 7. The driving device 300 is a variant of the driving device 200. For the driving device 300, parts that are the same as those of the driving device 200 have reference numbers that are the same or have the same last two digits appended thereto, and an explanation thereof is omitted. Moreover, FIG. 5 and FIG. 6 show cross-sections of different positions of the driving device 300. FIG. 7 shows a plan view of the driving device 300 observed from the axial direction. FIG. 5 corresponds to a cross-section along line V-V of FIG. 7, and FIG. 6 corresponds to a cross-section along line VI-VI of FIG. 7.

In the driving device 300, one axial gap motor 52 is attached to one end of each of the crankshafts 32. As shown in FIGS. 5, 7, brakes 317 are respectively attached to the other end of two of the crankshafts 32. As shown in FIGS. 6, 7, an encoder 318 is attached to one of the crankshafts 32. Moreover, FIG. 7 shows a state in which a cap 321 (see FIG. 5) and a cap 319 (see FIG. 6) have been removed. As in the driving device 200, in the driving device 300, the brakes 317, the encoder 318, etc. can be attached to the crankshafts 32 by using the other end(s) of the crankshaft(s) 32.

Considerations concerning the embodiments will be given. Curable resin, a bolt, etc. can be used instead of adhesive to affix the stator cores to the motor flange. Alternatively, the stator cores and the motor flange may be molded integrally by using resin.

In the first and second embodiments, the rotors of the two axial gap motors face one another on each of the crankshafts. The stators of the two axial gap motors may face one another. That is, the two stators may be disposed between the two rotors.

Specific examples of the present invention are described above in detail, but these examples are merely illustrative and place no limitation on the scope of the patent claims. The technology described in the patent claims also encompasses various changes and modifications to the specific examples described above. The technical elements explained in the present specification or drawings provide technical utility either independently or through various combinations. The present invention is not limited to the combinations described at the time the claims are filed. Further, the purpose of the examples illustrated by the present specification or drawings is to satisfy multiple objectives simultaneously, and satisfying any one of those objectives gives technical utility to the present invention.

The invention claimed is:

1. A driving device comprising:
a gear unit and a plurality of axial gap motors, each axial gap motor having a rotor and a stator,
the gear unit comprising:
a plurality of input shafts supported by a supporting member; and
a driven member to which the plurality of input shafts is engaged;
wherein each motor rotor is respectively attached to a corresponding one of the input shafts;
each motor stator is attached to a housing that is detachably attached to the supporting member;
the housing is attached to the supporting member, such that respective phase angles of the rotors of all of the motors are equal;
each of the input shafts has a first and a second of the axial gap motors attached thereto, and
either the rotors or the stators of the first and the second axial gap motors are disposed so as to face each other.

2. The driving device according to claim 1, wherein
the input shafts each axially extend beyond both sides of the driven member,
one of the first axial gap motors is disposed at a first axial end of each one of the input shafts, and
one of the second axial gap motors is disposed at a second axial end of each one of the input shafts.

3. The driving device according to claim 2, wherein
the housing comprises a first housing part and a second housing part, which are detachably attached to the supporting member;
the stators of the first axial gap motors are attached to the first housing;
the stators of the second axial gap motors are attached to the second housing; and
the first housing and the second housing are attached to the supporting member, such that the respective phase angles of all of the rotors are equal.

4. The driving device according to claim 1, wherein
the plurality of axial gap motors comprises a plurality of first axial gap motors and a plurality of second axial gap motors, and
each set of one of the first axial gap motors and one of the second axial gap motors is disposed at one end of each of the input shafts.

5. The driving device according to claim 4, the gear unit further comprising:
a case having an inner circumference, an internal gear being defined on the inner circumference;
wherein the supporting member includes a carrier supported by the case coaxially with the internal gear;
the input shafts comprise a plurality of crankshafts, each of which extends parallel to a center axis of the internal gear, is supported by the carrier, and includes at least one eccentric member;
the driven member includes an external gear engaged with the eccentric members and configured to rotate eccentrically while meshing with the internal gear; and
the plurality of crankshafts and rotors are respectively coupled by splines each having a plurality of grooves.

6. A driving device comprising:
a gear unit and a plurality of motors, each motor having a rotor and a stator,
the gear unit comprising:
a plurality of input shafts supported by a supporting member;
a case having an inner circumference, an internal gear being defined on the inner circumference; and
a driven member to which the plurality of input shafts is engaged;
wherein each motor rotor is respectively attached to a corresponding one of the input shafts;
each motor stator is attached to a housing that is detachably attached to the supporting member;
the housing is attached to the supporting member, such that respective phase angles of the rotors of all of the motors are equal;
the supporting member includes a carrier supported by the case coaxially with the internal gear;
the input shafts comprise a plurality of crankshafts, each of which extends parallel to a center axis of the internal gear, is supported by the carrier, and includes at least one eccentric member;
the driven member includes an external gear engaged with the eccentric members and configured to rotate eccentrically while meshing with the internal gear; and
the plurality of crankshafts and rotors are respectively coupled by splines each having a plurality of grooves.

7. A device comprising:
a plurality of first axial gap motors and a plurality of second axial gap motors, each motor having a rotor and a stator;
a supporting member;
a plurality of input shafts supported by the supporting member and being respectively connected to the motor rotors;
at least one driven member engaged with the plurality of input shafts; and
a housing detachably attached to the supporting member, the motor stators being affixed to the housing and respective phase angles of each of the motor rotors are aligned;
wherein each of the input shafts has one of the first axial gap motors and one of the second axial gap motors attached thereto such that either the rotors or the stators of the first and the second axial gap motors are disposed so as to face each other.

8. The device according to claim 7, wherein:
the input shafts each protrude beyond both axial sides of the driven member,
the first axial gap motors are respectively disposed at a first axially-protruding end of the input shafts, and
the second axial gap motors are respectively disposed at a second axially-protruding end of the input shafts.

9. The device according to claim 8, wherein:
the housing comprises a first housing part and a second housing part, which are detachably attached to the supporting member,
the stators of the first axial gap motors are attached to the first housing,
the stators of the second axial gap motors are attached to the second housing, and
the first housing and the second housing are attached to the supporting member, such that the respective phase angles of all of the rotors are aligned.

10. A device comprising:
a plurality of first axial gap motors and a plurality of second axial gap motors, each motor having a rotor and a stator;
a supporting member;
a plurality of input shafts supported by the supporting member and being respectively connected to the motor rotors;
at least one driven member engaged with the plurality of input shafts; and
a housing detachably attached to the supporting member, the motor stators being affixed to the housing and respective phase angles of each of the motor rotors are aligned;
wherein each set of one of the first axial gap motors and the second axial gap motors is disposed at one axial end of each of the input shafts.

11. The device according to claim 10, further comprising:
a case having an inner circumference, an internal gear being defined on the inner circumference;
wherein the supporting member includes a carrier supported by the case coaxially with the internal gear;
the input shafts comprise a plurality of crankshafts, each of which extends parallel to a center axis of the internal gear, is supported by the carrier, and includes at least one eccentric member;
the driven member includes an external gear engaged with the eccentric members and configured to rotate eccentrically while meshing with the internal gear; and
the plurality of crankshafts and rotors are respectively coupled by splines each having a plurality of grooves.

12. A device comprising:
a plurality of motors, each motor having a rotor and a stator;
a supporting member;
a plurality of input shafts supported by the supporting member and being respectively connected to the motor rotors;
at least one driven member engaged with the plurality of input shafts;
a housing detachably attached to the supporting member, the motor stators being affixed to the housing and respective phase angles of each of the motor rotors are aligned; and
a case having an inner circumference, an internal gear being defined on the inner circumference;
wherein the supporting member includes a carrier supported by the case coaxially with the internal gear;
the input shafts comprise a plurality of crankshafts, each of which extends parallel to a center axis of the internal gear, is supported by the carrier, and includes at least one eccentric member;
the driven member includes an external gear engaged with the eccentric members and configured to rotate eccentrically while meshing with the internal gear; and
the plurality of crankshafts and rotors are respectively coupled by splines each having a plurality of grooves.

13. A device comprising:
a plurality of first axial gap motors and a plurality of second axial gap motors, each motor having a rotor and a stator;
a carrier;
a plurality of crankshafts rotatably supported by the carrier and being respectively connected to the motor rotors;
at least one external gear engaged with the plurality of crankshafts and being drivable thereby; and
a housing detachably attached to the carrier, the motor stators being affixed to the housing and respective phase angles of each of the motor rotors are aligned;
wherein each of the crankshafts has one of the first axial gap motors and one of the second axial gap motors attached thereto such that either the respective rotors or the respective stators of the first and the second axial gap motors directly oppose each other.

14. The device according to claim 13, wherein:
the housing comprises a first housing part and a second housing part, which are detachably attached to the carrier,
the stators of the first axial gap motors are attached to the first housing,
the stators of the second axial gap motors are attached to the second housing, and
the first housing and the second housing are attached to the supporting member, such that the respective phase angles of all of the rotors are aligned.

* * * * *